Patented Apr. 29, 1930

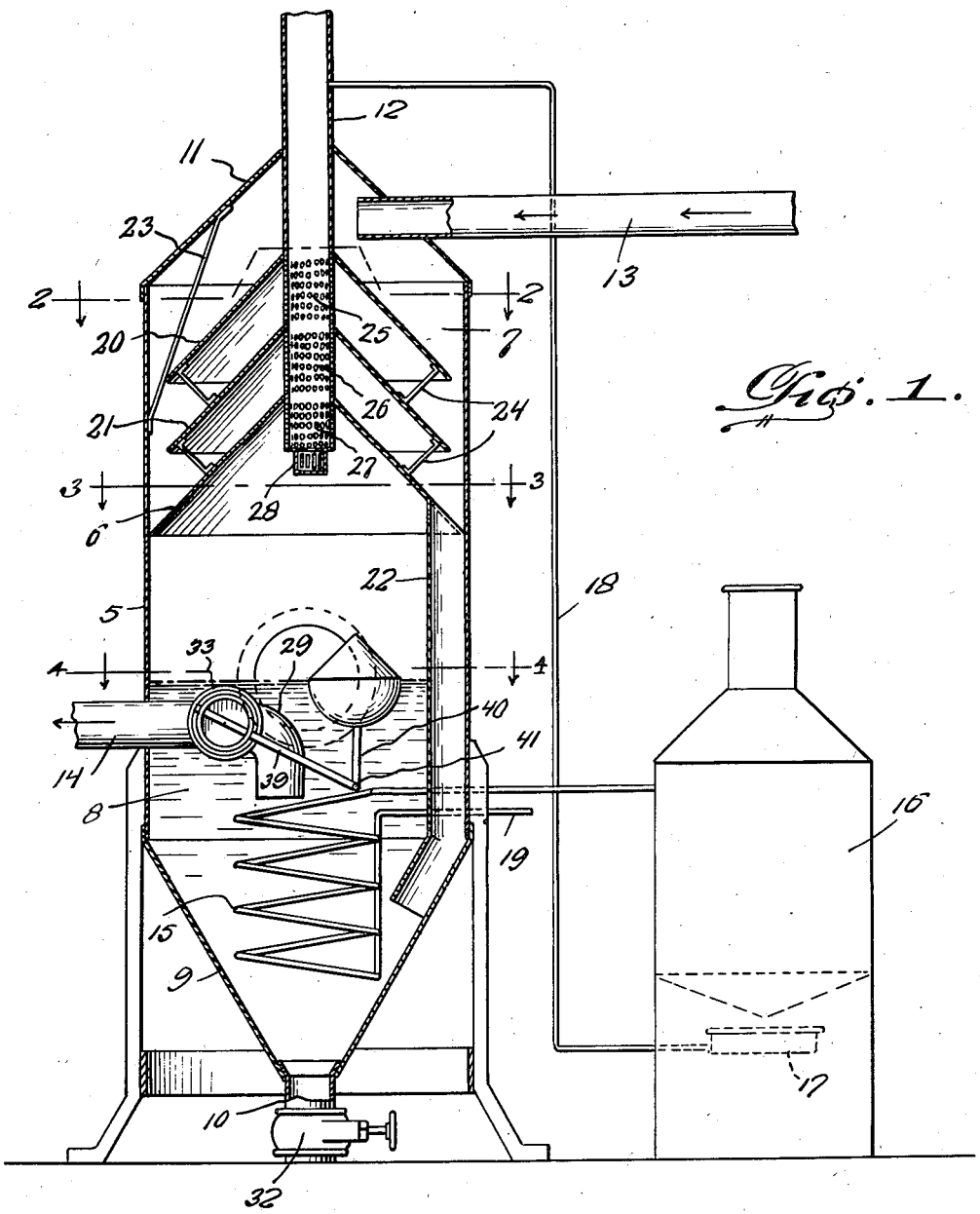

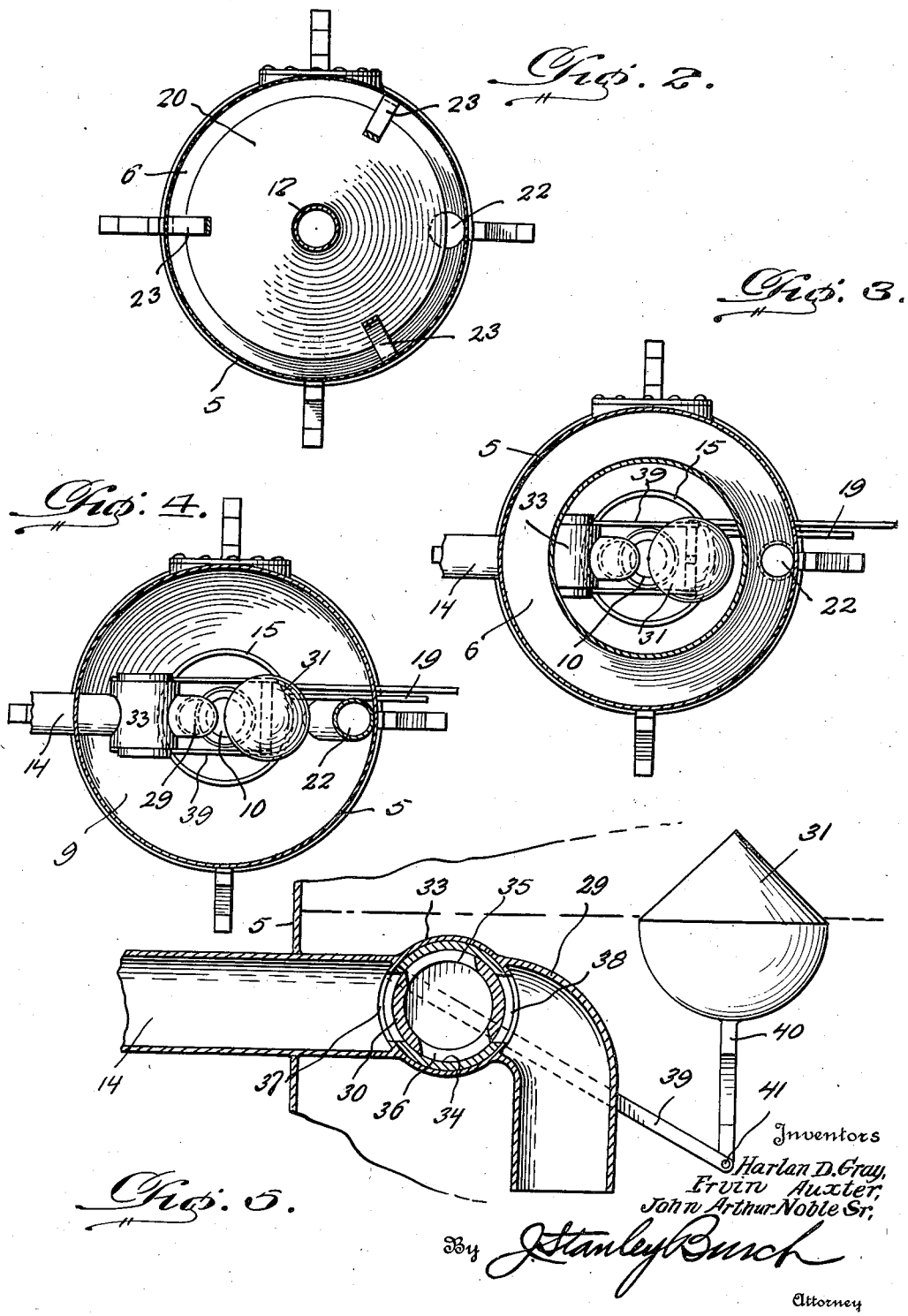

1,756,288

UNITED STATES PATENT OFFICE

HARLAN D. GRAY, ERVIN AUXTER, AND JOHN ARTHUR NOBLE, SR., OF SHREVEPORT, LOUISIANA, ASSIGNORS, BY DIRECT AND MESNE ASSIGNMENTS, TO SUPERIOR OIL AND GAS SEPARATOR COMPANY, INCORPORATED, OF SHREVEPORT, LOUISIANA, A CORPORATION OF LOUISIANA

GAS AND OIL SEPARATOR

Application filed December 17, 1928. Serial No. 326,686.

This invention relates to improvements in gas and oil separators of that type adapted to effect the separation of natural gas from crude oil as the latter is delivered from the well.

The primary object of the present invention is to provide an improved gas and oil separator of the above kind, whereby the maximum gas content may be liberated from the oil.

A further object is to provide a separator of the above kind in which means is provided to permit the outlet of liberated gas directly from the settling chamber and to prevent such gas from passing into the expansion or pressure chamber, thereby avoiding passage of such gas through or entraining of part of such gas in the film of oil in the latter chamber and insuring most efficient initial liberation of gas in such expansion chamber.

Another object is to provide simple and efficient float valve means to maintain a submergence of the oil outlet of the settling chamber.

Still another object of the present invention is to provide a gas and oil separator of the above kind which is extremely simple and durable in construction, efficient in operation, and adapted for long continued use without attention or repair.

The invention consists in the novel form, combination and arrangement of parts hereinafter more fully described, shown in the accompanying drawings, and claimed.

In the drawings:

Figure 1 is a view, partly in elevation and partly in vertical section, showing the present invention.

Figures 2, 3 and 4 are horizontal sections, respectively taken on lines 2—2, 3—3, and 4—4 of Figure 1; and Figure 5 is an enlarged fragmentary detail view, showing the oil outlet and float valve in vertical section.

The embodiment of the invention illustrated includes an upright casing 5 divided by a conical baffle partition 6 into an upper expansion chamber 7 and a lower settling chamber 8 formed with a tapering bottom 9 having a valved drain pipe 10. The top 11 of the casing is preferably conical and centrally perforated, a vertical gas outlet pipe 12 being fixed in the central opening of the top 11 and in a central opening of the baffle partition 6. A pipe 13 delivers oil and gas from the well into the expansion chamber 7 at the top of the latter, and the pipe 12 leads the gas from the expansion chamber and the top of the settling chamber to any suitable receiver or destination.

An oil outlet pipe 14 leads from the settling chamber intermediate the top and bottom of the latter. Oil heating means is provided including a coil 15 arranged in the settling chamber and connected to the steam space of a boiler 16 which utilizes a gas burner 17 supplied with fuel from the gas outlet pipe 12 by means of a branch pipe 18 leading from the latter. The exhaust from the coil 15 is effected through pipe 19 which extends through the wall of the settling chamber.

Oil spreading means is provided in the expansion chamber, such as conical baffles 20 and 21 fitted on the gas outlet pipe 12 and arranged in spaced relation, one below the other in spaced relation to and above the baffle partition 6. The periphery of the partition 6 snugly contacts the wall of the casing while the peripheries of the baffles 20 and 21 are adjacent but spaced from such wall. The oil is delivered onto the upper surface of the baffle 20 and spreads in a film over the same, flowing downwardly thereover and falling onto the partition 6. The partition 6 has a peripheral outlet opening from which leads a pipe or spout 22 by means of which the oil is delivered from the bottom of the expansion chamber to the settling chamber below the oil outlet 14 thereof and the oil level therein. The top 11 of the casing is reinforced against destructive pressure by means of inclined internal braces 23, and the baffles 20 and 21 are supported at their margins by legs or brackets 24. The gas outlet pipe is provided with gas admitting ports 25, 26 and 27 between the baffles 20 and 21, between the baffle 21 and the partition 6, and directly below the partition 6 where said pipe terminates in a reduced perforated end 28, to minimize entrance of oil into the gas line.

The oil outlet pipe 14 has a submerged end portion 29 within the settling chamber provided with a rotary cut-off or valve member 30 which is actuated by means of a float 31 arranged to cause the pipe to be closed to the exit of oil before the level of the oil lowers to the open end of the pipe, thereby preventing the escape of gas along with the oil flowing from the settling chamber. A valve 32 is provided to permit sand and water to be drawn from the settling chamber when desired.

The pipe 14 has a horizontal cylindrical valve casing 33 provided with a bearing bushing or lining 34 within which the valve member 30 is rotatably fitted, and such valve member is hollow and formed with opposed peripheral ports 35 and 36 movable into and out of registry with opposed ports at 37 and 38 in the valve casing 33 and bushing 34. The ends of valve member 30 are closed and project from the opposite ends of the casing 33 where they are diametrically pierced by the ends of a pair of spaced parallel levers 39 which are fastened therein. The float 31 has a bifurcated depending rod 40, the lower ends of the legs of which are pivoted to the other free ends of the levers 39 as at 41.

In practice, oil is delivered from the well through pipe 13 onto the top baffle 20 by which it is spread to run downwardly in a film and drop in an annular curtain to the bottom of the expansion chamber 7. The major portion of the gas in the oil is thus liberated to find its way to the gas outlet pipe 12 through the peforations 25 and 26, and the oil flows from the bottom of the chamber 7 through pipe 22 into the settling chamber 8. The oil is heated in the latter chamber by the coil 15 so as to weaken the surface tension upon any water contained in the oil, allowing the water to settle in the bottom of the chamber 8 and facilitating final liberation of gas from the oil. The gas finally liberated passes to the top of the settling chamber where it flows through the perforations 27 into the gas outlet pipe, being prevented from passing into the expansion chamber 7 by the baffle partition 6 and consequently being prevented from passing through the film or curtain of oil in such expansion chamber. This avoids entraining of the gas from the settling chamber in the oil in the expansion chamber so that maximum liberation of the gas content of the oil is insured. The pipe 22 opens in the settling chamber below the oil level therein so as to prevent the gas from finding its way to the expansion chamber therethrough. It will be seen that the float 31, rising with the level of the oil, opens the valve 30 to permit the oil to escape through the pipe 14 in proportion to the volume of oil admitted to the settling chamber, thereby preventing undue rising of the oil level under normal conditions of use. On the other hand, should the supply of oil be cut down sufficiently, the float will lower with the level of the oil so as to operate valve 30 to partly or entirely cut off the escape of oil and thereby maintain a submergence of the oil outlet.

Minor changes may be made without departing from the spirit and scope of the invention as claimed.

What we claim is:

1. In a gas and oil separator, the combination of an expansion chamber arranged to receive oil and gas in its upper portion, means for spreading the oil to flow downwardly and outwardly in a film and then fall in a curtain adjacent the wall of such chamber, gas outlet means arranged to outlet the gas from within the falling curtain of oil, an oil settling chamber below the expansion chamber, means to conduct the oil from the bottom of the expansion chamber to the settling chamber below the level of oil in the latter, said oil conducting means affording the only communication for the passage of oil from said expansion chamber to said settling chamber, said gas outlet means being further arranged to outlet the gas from the top of the settling chamber and affording the only communication for the passage of gas from the space in the settling chamber above the oil level therein, an oil outlet for the settling chamber, and float valve means to maintain a submergence of the oil outlet.

2. The combination, in a gas and oil separator, of an expansion chamber having a settling chamber communicating therewith, means for delivering oil and gas into the upper portion of the expansion chamber, a conical baffle arranged in said expansion chamber to receive the incoming oil and spread it in a thin film to fall in a curtain adjacent the wall of such chamber, gas outlet means communicating with the expansion chamber below the conical baffle and with the top of the settling chamber, means to prevent gas from passing from the settling chamber except through said communicating means, and means for drawing oil from the settling chamber.

3. In a gas and oil separator, the combination of a casing, a conical baffle partition dividing the casing into an upper expansion chamber and a lower settling chamber, an elevated surface in the expansion chamber adapted to sustain a flow of oil thereover in a thin film to fall therefrom in a curtain, means for delivering oil onto said surface, gas outlet means to outlet gas from the top of the settling chamber and from the expansion chamber, from below said surface, means to conduct the oil from the bottom of the expansion chamber to the settling chamber below the level of oil in the latter, said oil conducting means affording the only communication for the passage of oil from said expansion chamber to said settling chamber, and means for withdrawing oil from said settling chamber.

4. A gas and oil separator comprising a casing, a partition dividing said casing into an upper expansion chamber and a lower settling chamber, a pipe for conducting oil from the bottom of the expansion chamber to the settling chamber below the level of oil in the latter, said chambers being devoid of communication other than by said pipe for the passage of oil from the expansion chamber to the settling chamber, a gas outlet for the expansion chamber and the top of the settling chamber, oil spreading means in the expansion chamber above the gas outlet therefor, means to deliver oil and gas onto said spreading means, an oil outlet for the settling chamber, and float valve means associated with said oil outlet to maintain the level of oil in said settling chamber.

5. A gas and oil separator comprising an expansion chamber, an oil and gas inlet for said chamber, a plurality of spaced conical baffles below said oil and gas inlet, each having its periphery adjacent but spaced from the wall of said chamber, a settling chamber below and communicating with said expansion chamber, a central gas outlet for said chambers passing through said baffles, an oil outlet pipe in said settling chamber, a float valve means associated with said oil outlet pipe to maintain the level of oil in said settling chamber, a conical baffle partition below said baffles and dividing said chambers, said gas outlet passing through said baffle partition, and a pipe forming the sole communication for the passage of oil from said expansion chamber to said settling chamber and adapted to conduct oil from the bottom of the expansion chamber to the settling chamber below the level of oil in the latter.

In testimony whereof we affix our signatures.

HARLAN D. GRAY.
ERVIN AUXTER.
JOHN ARTHUR NOBLE, Sr.